Dec. 7, 1971  C. L. GUILD ET AL  3,625,013
EXPANSIBLE MANDRELS FOR USE IN DRIVING OR
WITHDRAWING TUBULAR PILES
Filed June 16, 1970  9 Sheets-Sheet 1

Inventors:
Charles L. Guild,
Willard B. Goodman,
by *Attorney*

United States Patent Office 3,625,013
Patented Dec. 7, 1971

3,625,013
EXPANSIBLE MANDRELS FOR USE IN DRIVING OR WITHDRAWING TUBULAR PILES
Charles L. Guild, 7 Stone Tower Lane, Barrington, R.I. 02806, and Willard B. Goodman, P.O. Box 62, Newport, Oreg. 97365
Filed June 16, 1970, Ser. No. 46,641
Int. Cl. E02d 7/30
U.S. Cl. 61—53.72
11 Claims

ABSTRACT OF THE DISCLOSURE

Expansible mandrels are disclosed for use in driving or withdrawing tubular piles. The mandrels comprise sections interconnected by cables in a manner such that a pull on one cable expands the mandrel so that it will tightly grip the pile into which it has been inserted and a pull on the other cable draws the sections together so that the mandrel may be inserted in or withdrawn from the pile. In one embodiment, a single acting ram housed within the mandrel controls the expansion cable while in another embodiment of the invention, a double acting ram is used so that both cables can be actuated thereby.

---

The present invention relates to expansible mandrels for use in driving or withdrawing tubular piles and the like.

BACKGROUND OF THE INVENTION

Tubular piles cannot be successfully driven by blows applied to their upper ends because their wall structures are not sufficiently strong. For that reason, as pointed out in our patent No. 3,264,838 and in our co-pending application Ser. No. 824,631, filed May 14, 1969, it is necessary to provide a mandrel that can be expanded from a pile-entering condition into a pile-gripping condition.

Mandrels of the type disclosed in said co-pending application are adapted for such uses as they provide a mandrel construction in which lengthwise sections are connected by cable in a manner such that a pull on one cable draws the sections together to provide a pile-entering or removal relationship while a pull on the other cable forces the sections apart to provide their pile-gripping relationship. Such mandrels present a wide range of construction and assembly problems in ensuring that the cable actuated connections have the desired effect throughout the length of the mandrel.

The principal objectives of the present invention are to provide expansible mandrels that will minimize the above generally indicated problems, an objective attained by providing a cable actuated expansible mandrel of the type shown in said co-pending application with power operated means to operate the expansion cable, the power operated means being carried by the mandrel adjacent the head and including a connection with the expansion cable within the mandrel, the connection having a first sheave movable lengthwise of the mandrel and a fixed sheave between the first sheave and the uppermost connecting means. One end portion of the expansion cable extends from its anchored end about the fixed sheave and then about the first sheave and then directly to the foot end of the mandrel.

Another objective of the invention is to provide power operated means also to operate the retraction cable, an objective attained by utilizing as the power operated means, a double acting ram mounted within the mandrel with the first sheave connected to the downwardly extending end of its stem and one end of the retraction cable trained about a sheave adjacent the head and secured to the upwardly extending stem end.

In the accompanying drawings, there are shown embodiments of the invention illustrative of these and other of its objectives, novel features and advantages.

In the embodiment of the invention illustrated by FIGS. 1-19, an expansible mandrel is shown as consisting of a pair of arcuate sections generally indicated at 25, each of substantial length and of an arcuate extent sufficiently less than 180° so that when the sections are closed together, the mandrel may be entered into a tubular pile of a particular diameter and tightly grip that pile when the mandrel sections are forced apart. In practice, the mandrel sections have external ribs spaced and arranged for mating engagement with the ribs and channels of a corrugated pile or for positive engagement with tubular piles of other types. As these form no part of the present invention, they are omitted from the drawings but may be seen in our co-pending application Ser. No. 824,631, filed May 14, 1969, and in U.S. Pat. No. 3,264,834.

Figure 1:
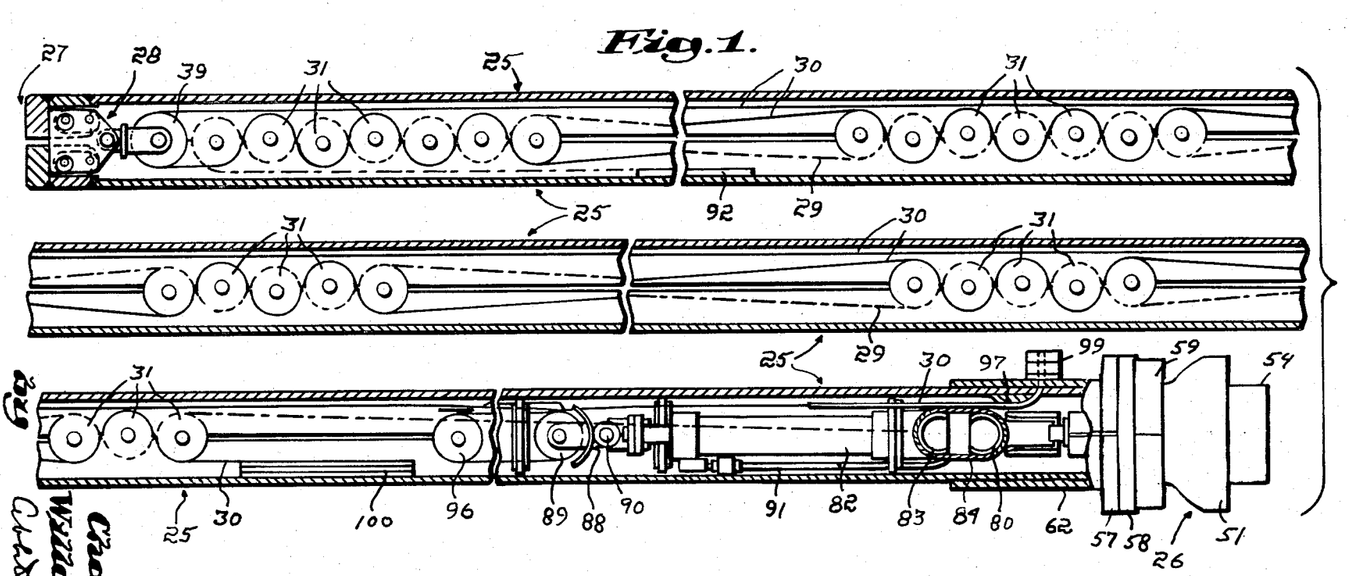
FIG. 1 is a somewhat schematic section taken lengthwise of a mandrel in accordance with one embodiment of the invention.
Figure 2:
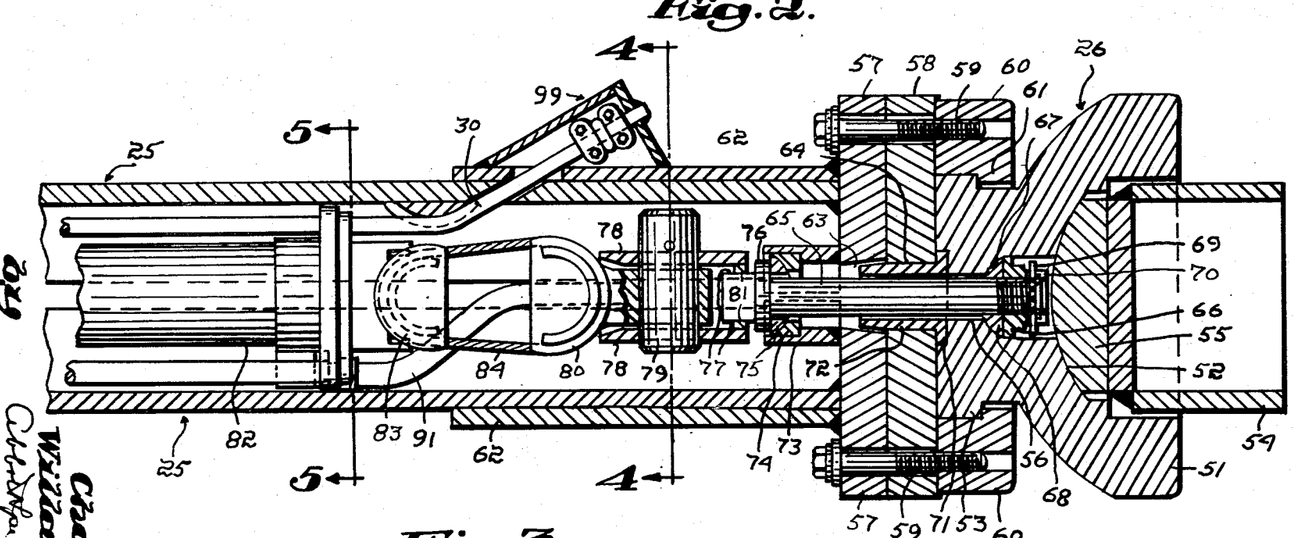
FIG. 2 is a section, on an increase in scale, taken lengthwise through the head end of the mandrel and including the upper end of the ram.
Figure 3:
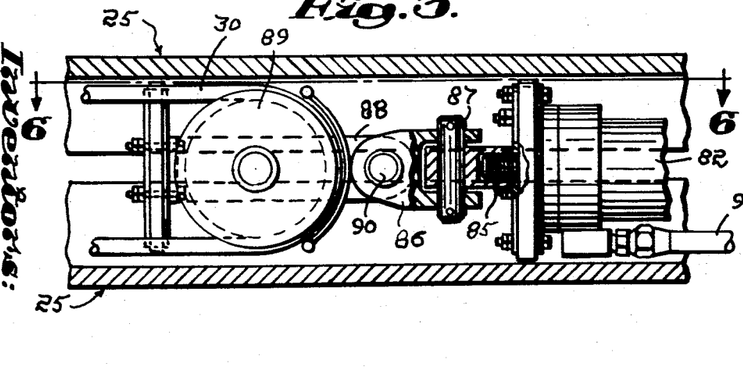
FIG. 3 is a section, also taken lengthwise of the mandrel, showing the connection of the ram to a cable.

The mandrel sections 25 are connected at their upper ends by a top or drive head, generally indicated at 26, best seen in FIG. 2. A boot 27 is secured to the bottom end of each mandrel section 25 and these are interconnected by an expansible unit, generally indicated at 28. The sections 25 are also connected to each other by means spaced lengthwise of the mandrel and operated by retraction and expansion cables 29 and 30, respectively, to effect the pile-entering and pile-gripping relationship of the mandrel sections. For convenience in distinguishing the cables, the retraction cable is shown in FIG. 1 in broken lines and the expansion cable as a solid line. The connecting means are shown as including sets of double sheaves 31, at least one sheave secured to each mandrel section. Typically, but not necessarily, the number of sheaves in each set decreases towards the head end of the mandrel and in the embodiment of the invention illustrated by FIG. 1, the mandrel may be assumed to be approximately sixty feet in length and there are seven sheaves in the lower sets, five sheaves in the intermediate sets, and three sheaves in the uppermost set.

Figure 18:
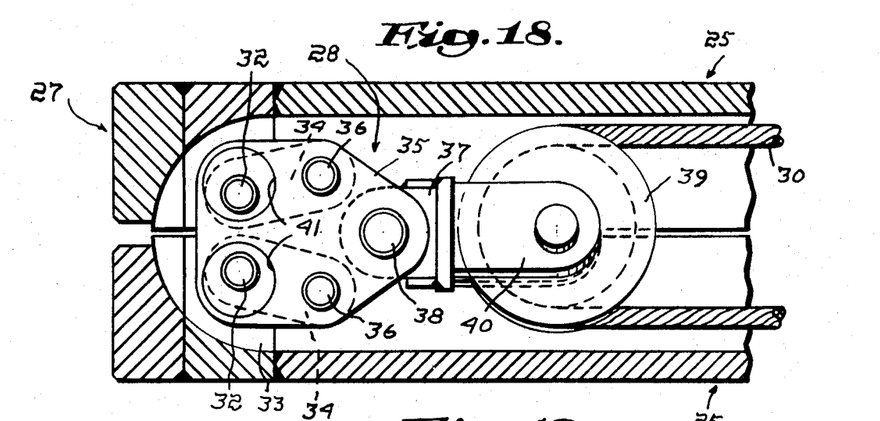
FIG. 18 is a section taken approximately along the indicated lines 18—18 of FIG. 19.
Figure 19:
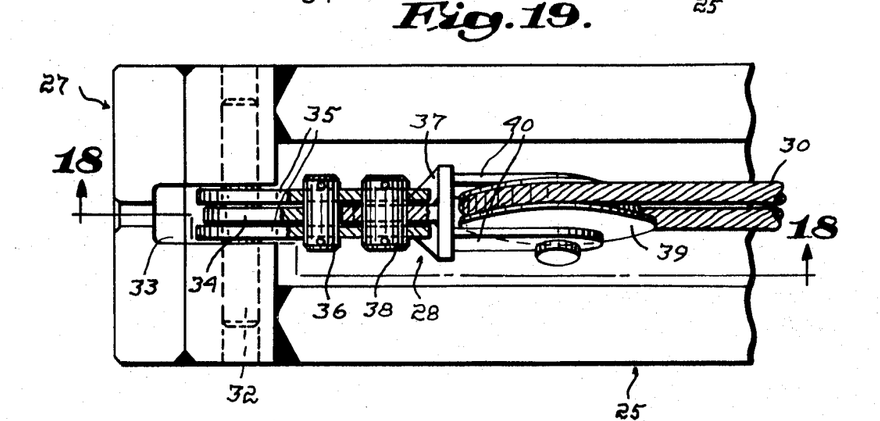
FIG. 19 is a section taken lengthwise of the foot end of the mandrel.

The unit 28, see FIGS. 1, 18, and 19, includes a pin 32 extending through each boot 27 and intersecting a vertical channel 33 therein, the pins 32 being parallel and the channels 33 being diametrically aligned. The pins 32 support corresponding ends of a pair of toggle links 34 connected at their other ends to an actuator 35 by pivots 36. The actuator 35 is connected to a carrier 37 by a pivot 38. A sheave 39 is rotatably supported between a pair of ears 40 with which the carrier 37 is provided.

It will be noted that the actuator 35 has laterally spaced holes 41 through each of which one of the pins 32 extends and that the holes 41 are of a substantially greater diameter than the pins 32 and that the free ends of the links 34 are inclined inwardly. When the actuator 35 is subjected to an upward pull, it functions to force the pins 32 and accordingly the boots 27 apart. The holes 41, when the links are parallel, also serve to limit the extent to which the pile-entering end of the mandrel can be expanded.

Figure 4:
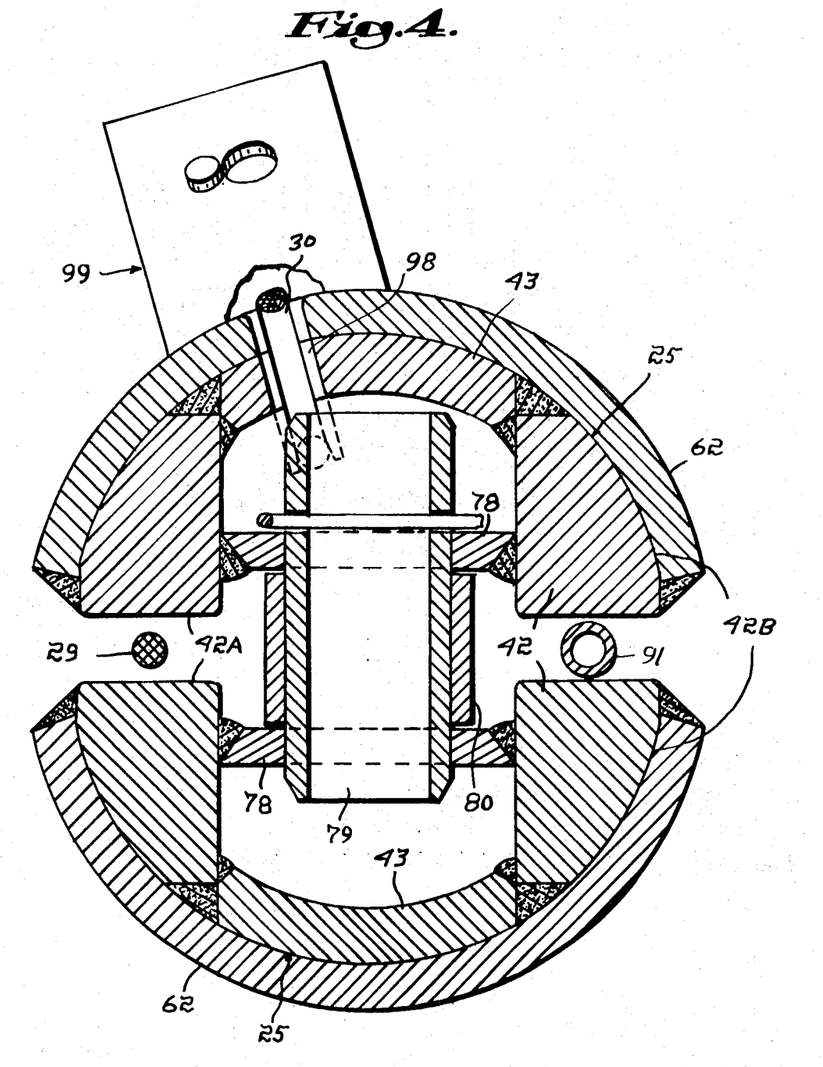
FIG. 4 is a section taken approximately along the indicated lines 4—4 of FIG. 2.
Figure 5:
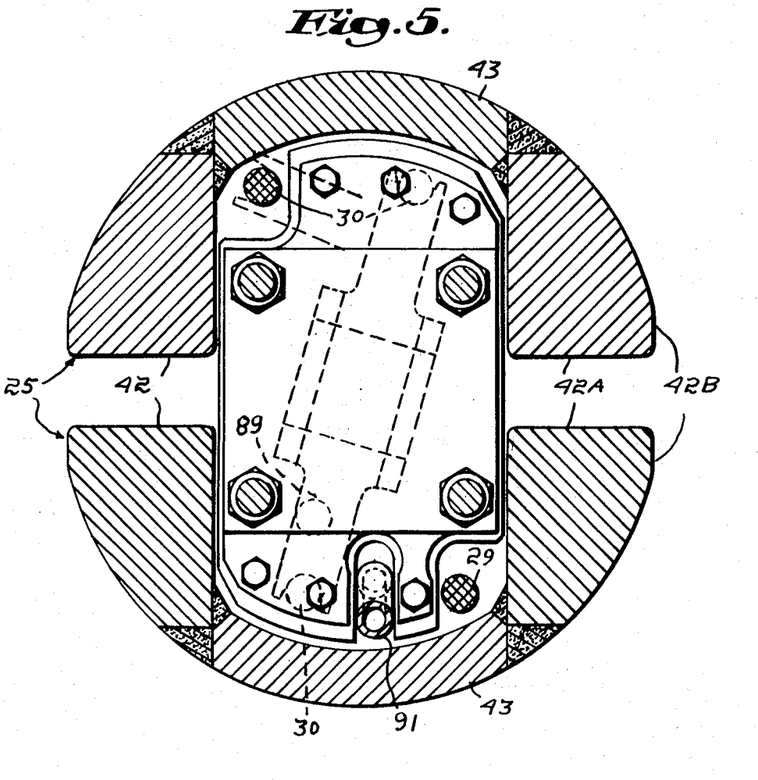
FIG. 5 is a section taken approximately along the indicated lines 5—5 of FIG. 2.
Figure 6:
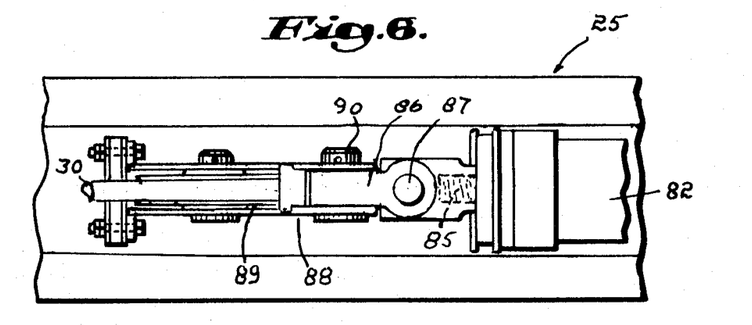
FIG. 6 is a section taken approximately along the indicated lines 6—6 of FIG. 3.
Figure 7:
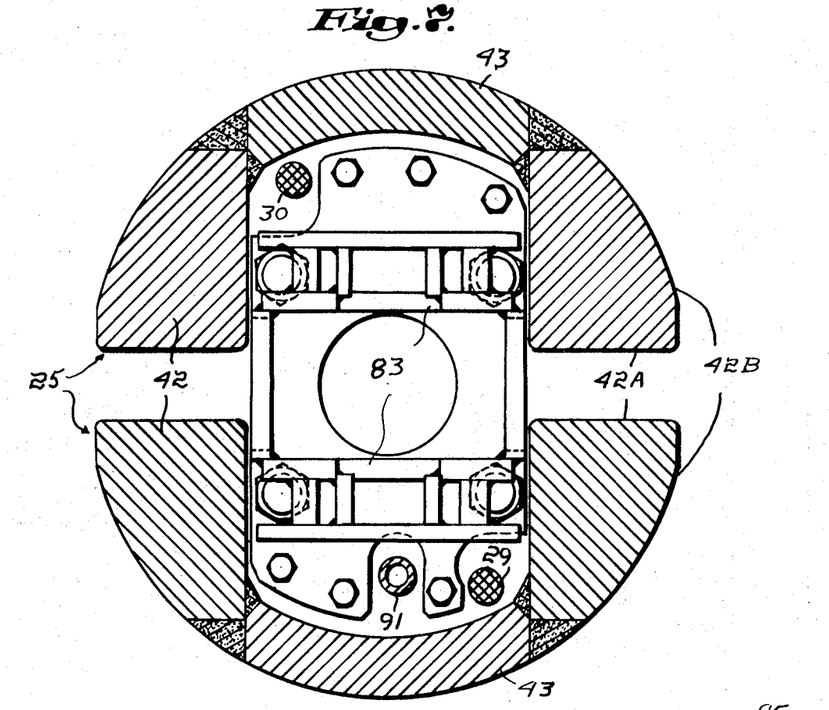
FIG. 7 is a section showing the upper end of the ram.
Figure 8:
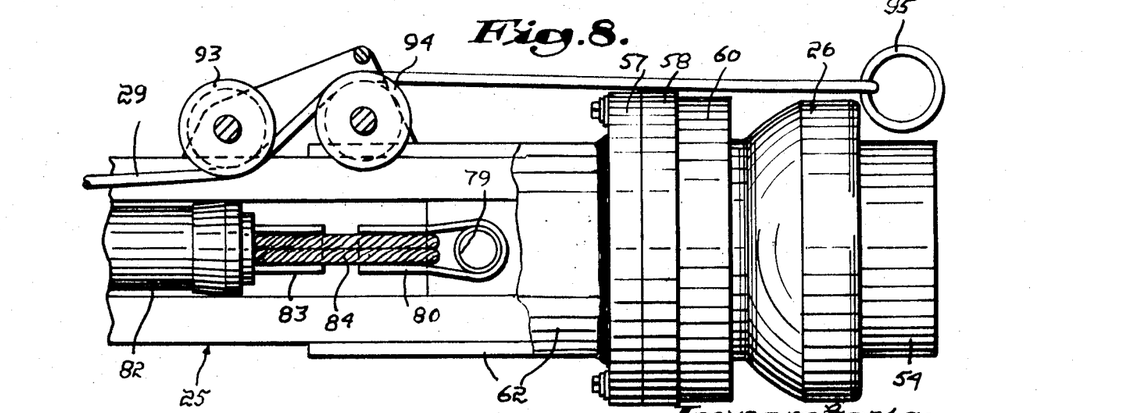
FIG. 8 is a fragmentary view of the head end of the mandrel showing the free end of the retraction cable.
Figure 9:
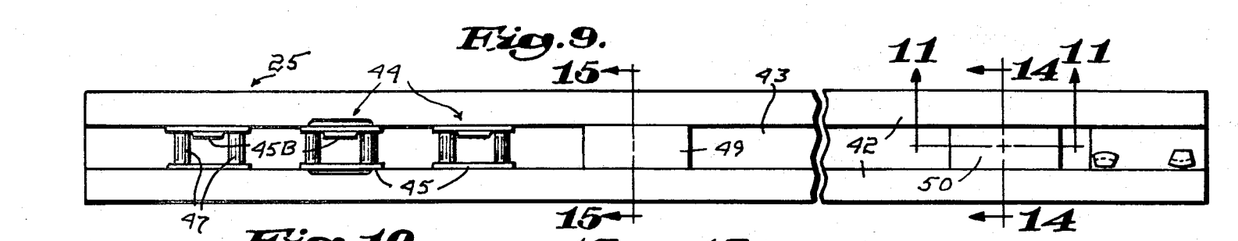
FIG. 9 is a plan view of a length of one mandrel section.
Figure 10:
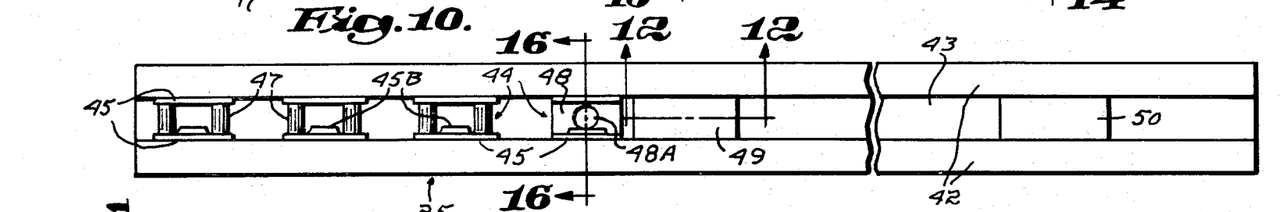
FIG. 10 is a like view of the mandrel section to be connected thereto.
Figure 11:
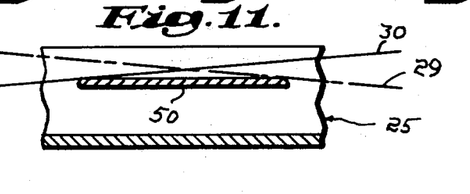
FIG. 11 is a section taken on the indicated lines 11—11 of FIG. 9.
Figure 12:
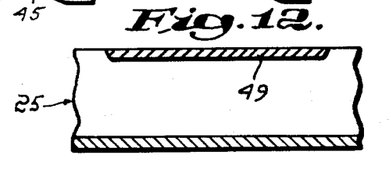
FIG. 12 is a section taken on the lines 12—12 of FIG. 10.
Figure 13:
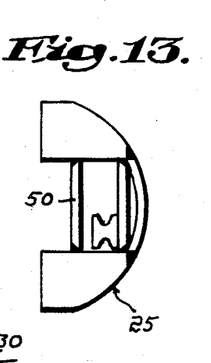
FIG. 13 is a view of the right hand end of the mandrel section of FIG. 9.
Figure 14:
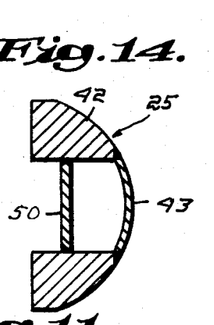
FIG. 14 is a section taken approximately along the indicated lines 14—14 of FIG. 9.
Figures 15, 16:
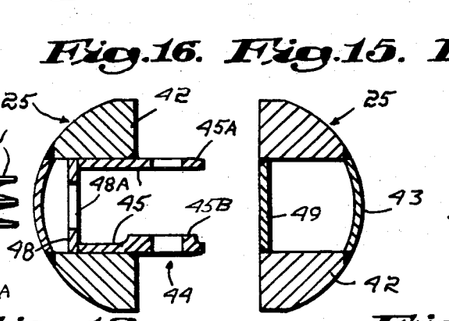
FIG. 15 is a section taken along the indicated lines 15—15 of FIG. 9.
FIG. 16 is a section taken approximately along the indicated lines 16—16 of FIG. 10.
Figure 17:
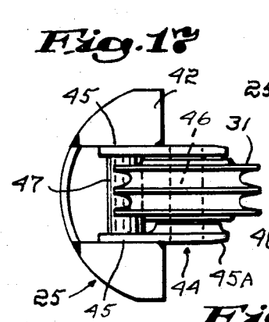
FIG. 17 is a view of the left hand end of the mandrel section shown in FIG. 9 with one of the sheaves mounted in place.

A preferred construction of the mandrel sections is shown in FIGS. 4, 5, and 7. Each section is shown as comprising two side members 42 of substantial cross sectional area, conveniently formed from bar stock, and a relatively thin central, arcuate member 43 welded thereto. The side members have co-planar faces 42A and outer rounded faces 42B having the same radius as the central members 43.

Each section 25 has sheave carriers welded to its side members, each spaced from the others to enable one of the carriers of the corresponding set of the other section 25 to be entered therebetween when the two sections are interconnected. The lower lengths of the section 25 and their carriers are shown in FIGS. 9–17. The carriers are generally indicated at 44 and include side plates 45 welded to the side members 42 and protruding therefrom with their exposed edges inwardly tapered as at 45A, see FIGS. 16 and 17, to facilitate mandrel assembly. Corresponding ones of the walls has an inwardly disposed boss 45B having a bore transversely aligned with a bore in the opposite plate for the axle 46 of a double sheave 31. The plates 45 are interconnected within each mandrel section either by pairs of tubular members 47 or by a plate 48 having a central opening 48A to accommodate a portion of the sheave of that carrier. The last referred-to type of interconnection is used for the uppermost sheave of each set and above it, each section 25 has reinforcements welded to its side members 42, a reinforcement 49 adjacent the sheave set in the plane of the side member faces 42A, see FIG. 15, and the reinforcement 50 above it and spaced below that plane, see FIG. 14.

The drive head 26, see FIG. 2, comprises an upper part 51 having an upwardly opening, concave socket 52 and an outwardly disposed bottom shoulder 53. The socket is dimensioned to receive a cushion block 54 and an interposed aligning pad 55, having its convex lower face complemental to the socket 52. The upper head part 51 has an axial passage 56.

The head 26 also includes split plate sections 57, each welded to the upper end of a mandrel section 25 and an intermediate plate 58. The plate sections 57 and the intermediate plate 58 have bores which, when aligned freely receive the bolts 59 threaded into a split clamping ring 60 provided with an inwardly disposed shoulder 61 caught over the shoulder 53 thus to connect the upper end of the mandrel sections 25 to the head 26 with the mandrel sections spaced apart and provided with external reinforcements 62, the connection permitting the mandrel to turn relative to the head 26.

The plate sections 57 and the plate 58 when interconnected provide a bottom head plate, and have axial bores 63 and 64, respectively. A bolt 65 extends freely through the head bores 56, 63, and 64 and has a nut 66 threaded on its upper end. The upper end of the bore 56 has a counterbore providing a concave seat 67 for a convex washer 68 seated by the nut 66 which is locked as by a key 69 retained by a snap ring 70.

The lower end of the passage 56 has a counterbore to accommodate the flange 71 of an alignment bushing 72 through which the bolt 65 freely extends. The bushing 72 is a tight fit in the passage 64 in the intermediate plate and a loose fit in the passage 63.

On the bottom face of each bottom plate section 57 there is a downwardly disposed member 73 internally shouldered to support an annular cup 74 for a spherical washer 75 held in place by a projection 76 adjacent the lower end of the bolt 65 which has diametrically opposed flats 77.

Each mandrel section 25 has adjacent its upper end a wall 78, the walls being parallel to and close to their edges, each wall having a bore to receive a pin 79 pivotally supporting an arcuate holder 80. The walls 78 are also provided with internal shoulders 81 which engage the flats 77 thus to prevent the bolt 65 from turning relative to the mandrel sections.

A single acting, hydraulically operated ram 82 has an arcuate holder 83 secured to its upper end. A lashing 84 interconnects the holders 80 and 83. The piston rod 85 of the ram, see FIG. 3, has a yoke 86 connected thereto by a transverse pivot 87, and a mount 88 for a sheave 89 is connected thereto by a pivot 90 disposed at right angles to the pivot 87. A supply and relief conduit 91 is in communication with the bottom end of the ram 82 and it extends upwardly and between the mandrel sections adjacent the head 26.

In FIG. 1 the retraction cable 29 is indicated by a broken line to enable it to be more readily distinguished from the expansion cable 30. It will be noted that the retraction cable 29 is anchored as at 92 internally of a mandrel section 25 above the lowermost set of sheaves 31 and is trained downwardly about the bottom sheave thereof and then alternately about the remaining sheave thereof and of the other sets and then, see FIG. 8, outwardly between the mandrel sections adjacent the head 26 but in a direction opposite to the conduit 91 and then through one of the slots between the mandrel sections between the external sheaves 93 and 94 carried by one of the mandrel sections with its free end shown as having a ring 95 for a hook, not shown, by which an upward pull may be provided that will result in the sections 25 being drawn together to establish their pile-entering relationship. At other times, the ring 95 may be tied to the hammer.

Figure 21:
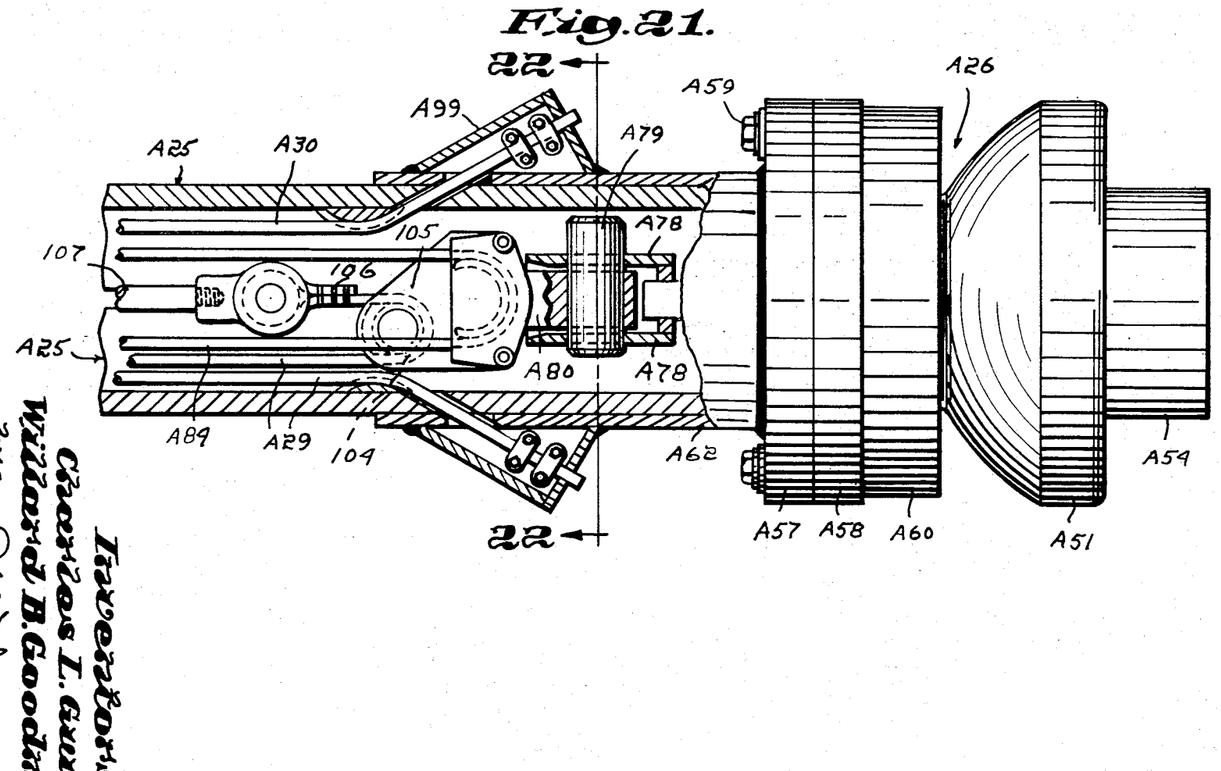
FIG. 21 is a section, on an increase in scale, taken lengthwise through the head end of the mandrel shown in FIG. 20.
Figure 22:
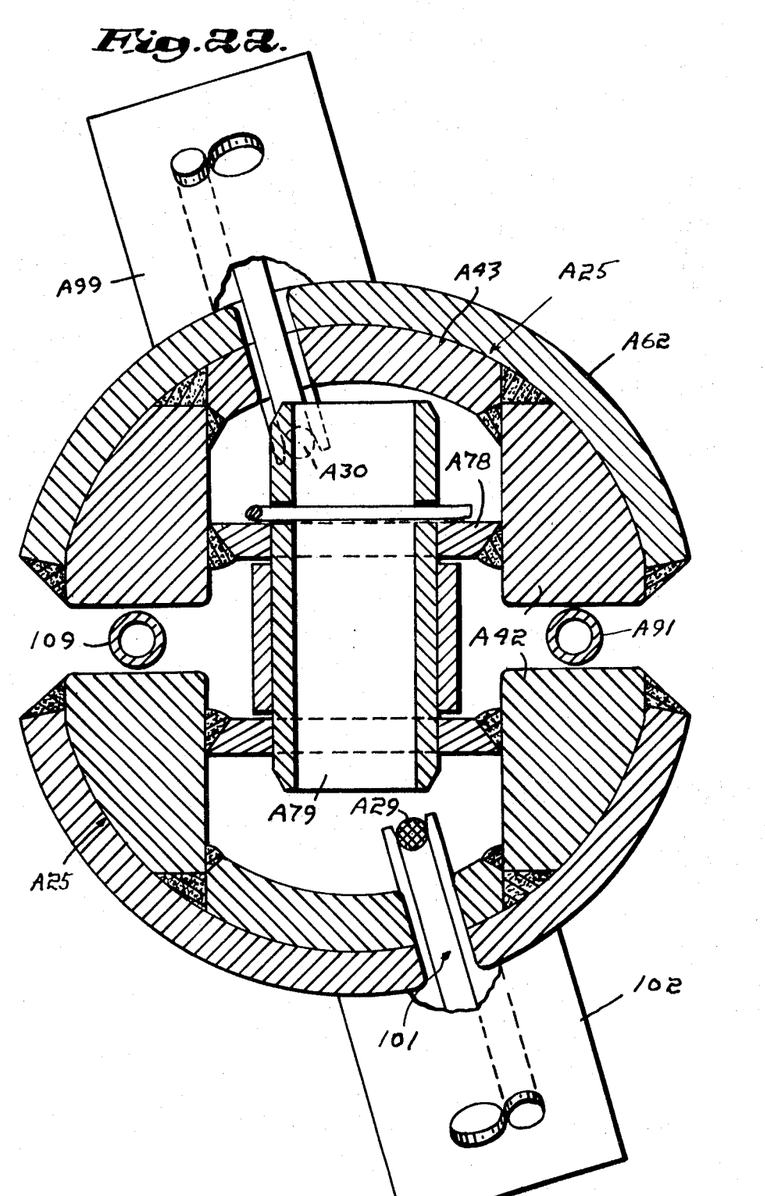
FIG. 22 is a section taken approximately along the indicated lines 22—22 of FIG. 21.

There is a sheave 96 between the sheave 89 and the set of double sheaves 31 proximate thereto. The expansion cable 30 has one end disposed about a fair lead 97 and extending outwardly through a port 98 at the upper end of one mandrel section 25 and there provided with an anchor 99. The cable 30 is first trained about the sheave 96 and then about the sheave 89'. The cable 30 then extends directly to the foot of the mandrel and about the sheave 39 of the unit 28 and is disposed about the sheave 31 of the several sets thereof in a manner opposite to the retraction cable 29 so that an upward pull on the cable 30 will result in the mandrel sections 25 being forced apart. The other end of the cable 30 is secured by an anchor 100 to one of the sections 25 above the uppermost set of sheaves 31.

Where control of the power employed both in mandrel expansion and mandrel contraction is wanted, a double acting ram A82 is employed, see FIGS. 21 and 22, and as an expansible mandrel employing such a ram may be like the embodiment just described, it will not be detailed and corresponding parts are designated by the prefix addition A to the appropriate reference numerals.

In this embodiment of the invention, the reeving of the cable A30 is the same as that of the cable 30 with one end secured to the upper, reinforced end of one of the mandrel sections A25 by an anchor A99. The retraction cable A29 has one end extending outwardly through a port 101 in the upper reinforced end of the other mandrel section A25 and then secured thereto by an anchor 102. From the anchor 102, the cable A29 extends to the opposite end of the mandrel where it is trained about the various sheaves in the manner shown in FIG. 1.

Figure 20:
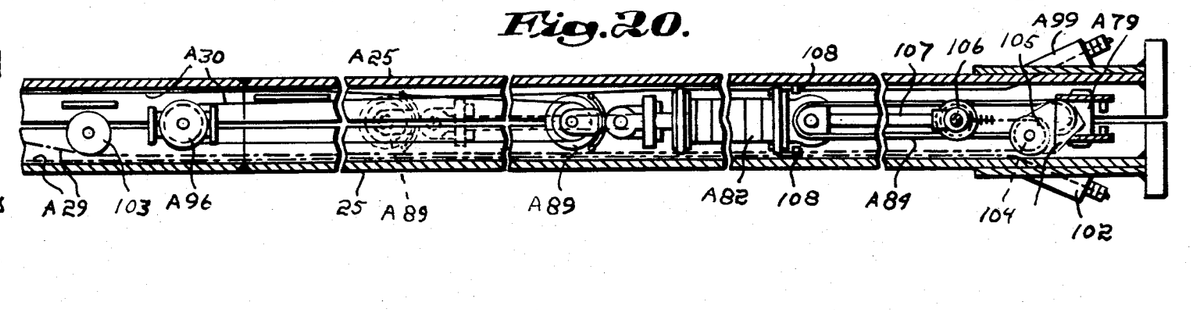
FIG. 20 is a section taken lengthwise through the upper part of an expansible mandrel in accordance with another embodiment of the invention.

It will be noted, see FIG. 20, that below the sheave A96, one of the mandrel sections A25 has a sheave 103 enabling the cable A29 to pass by the ram A82 and above a sheave 104 mounted on an offset 105 of the holder A80 and then secured as at 106 to the upwardly disposed portion 107 of the stem of the ram A82. In addition, the mandrel sections A25 are provided with stops 108 which prevent any material upward movement of the cylinder of the ram A82. The conduit A91 from the bottom of that cylinder passes outwardly between the mandrel section A25 at one side while the conduit 109 in connection with the upper end of that cylinder passes outwardly between the mandrel sections at the opposite side.

With expansible mandrels in accordance with the invention, the power operated cable means ensures positive but controlled cable actuation.

We claim:

1. An expansible mandrel for use in driving or withdrawing tubular piles and the like, said mandrel comprising sections, a head interconnecting the upper ends of the sections, a series of connecting means between the sections and operable to vary the spacing of the sections between pile-gripping and pile-entering relationships and including expansion and retraction cables common to the series, both ends of the expansion cable and one end of the retraction cable being anchored to the mandrel, a pull on the expansion cable in one direction urging the sections into said pile-gripping relationship, a pull on the retraction cable in one direction urging the sections into their pile-releasing relationship, and power operated means to effect said pull on the expansion cable, said power operated means being carried by the mandrel adjacent said head and including a connection within the mandrel with said expansion cable to effect said pull, said connection including a first sheave movable lengthwise of the mandrel and a fixed sheave between said first sheave and the uppermost connecting means, one end portion of said expansion cable extending from the anchor about the fixed sheave and then the first sheave and then directly to the foot end of the mandrel.

2. The expansible mandrel of claim 1 in which the power operated means includes a double acting ram within the mandrel with its cylinder in a fixed position, the first sheave is carried by the downwardly disposed stem and the other end of the retraction cable is secured to the upwardly disposed stem.

3. The expansible mandrel of claim 2 in which there is a support within the mandrel and secured to its head, the ram is dependingly secured to the support, and the mandrel sections include stops overlying the upper end of the cylinder of the ram.

4. The expansible mandrel of claim 2 in which the ram support includes a sheave about which said other end of the retraction cable is trained.

5. The expansible mandrel of claim 4 in which each connecting means includes at least three double sheaves, the sheaves of each connecting means being connected first one sheave to one mandrel section and then the next sheave to the other mandrel section, the sheaves providing opposite sinuous cable paths, the expansion cable being disposed along one path and the retraction cable passing upwardly through the several connecting means and about the sheave carried by the ram support.

6. The expansible mandrel of claim 5 in which the sheave of the ram shupport is laterally offset and one mandrel section includes a sheave between the uppermost connecting means and the power operated means disposed to offset the retraction cable to bypass the power operated means for training about the offset sheave.

7. An expansible mandrel for use in driving or withdrawing tubular piles and the like, said mandrel comprising sections, a head interconnecting the upper ends of the sections, a series of connecting means between the sections and operable to vary the spacing of the sections between pile-gripping and pile-entering relationships and including expansion and retraction cables common to the series, a pull on the expansion cable in one direction urging the sections into said pile-gripping relationship, a pull on the retraction cable in one direction urging the sections into their pile-releasing relationship, and power operated means carried by the mandrel adjacent said head to which the cables are connected and which is operable to effect said pulls.

8. The expansible mandrel of claim 7 in which the power operated means is operable simultaneously to effect a pull on one cable and the release of the other.

9. The expansible mandrel of claim 8 in which the connection between the cables and power operated means is within the mandrel.

10. The expansible mandrel of claim 7 in which the power operated means is within the mandrel.

11. The expansible mandrel of claim 7 in which the power operated means is within the mandrel and operable to effect simultaneously a pull on either cable and the release of the other.

References Cited
UNITED STATES PATENTS

| | | | |
|---|---|---|---|
| 2,881,593 | 4/1959 | Cobi | 61—53.72 |
| 3,060,695 | 10/1962 | McCall | 61—53.72 |

JACOB SHAPIRO, Primary Examiner

U.S. Cl. X.R.

242—72

Disclaimer 3,625,013.—*Charles L. Guild*, Barrington, R.I., and *Willard B. Goodman*, Newport, Oreg. EXPANSIBLE MANDRELS FOR USE IN DRIVING OR WITHDRAWING TUBULAR PILES. Patent dated Dec. 7, 1971. Disclaimer filed Jan. 7, 1974, by the inventors.

Hereby enters this disclaimer to claim 1 of said patent.

[*Official Gazette April 16, 1974.*]